United States Patent
Liu et al.

(10) Patent No.: US 10,169,316 B2
(45) Date of Patent: Jan. 1, 2019

(54) METHOD AND SYSTEM TO CONVERT DOCUMENT SOURCE DATA TO XML VIA ANNOTATION

(71) Applicant: International Business Machines Corporation, Armonk, NY (US)

(72) Inventors: Pu Liu, Endicott, NY (US); Victor M. Lourenco, Endicott, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 15/164,425

(22) Filed: May 25, 2016

(65) Prior Publication Data

US 2017/0344529 A1  Nov. 30, 2017

(51) Int. Cl.
- *G06F 1/00* (2006.01)
- *G06F 17/24* (2006.01)
- *G06F 17/22* (2006.01)
- *G06F 17/21* (2006.01)
- *G06F 17/27* (2006.01)

(52) U.S. Cl.
CPC .......... *G06F 17/241* (2013.01); *G06F 17/218* (2013.01); *G06F 17/2247* (2013.01); *G06F 17/246* (2013.01); *G06F 17/2765* (2013.01)

(58) Field of Classification Search
CPC .... G06F 17/241; G06F 17/246; G06F 17/245; G06F 17/2247; G06F 17/218; G06F 17/2765
USPC ........................................................ 715/212
See application file for complete search history.

(56) References Cited

U.S. PATENT DOCUMENTS

| | | | |
|---|---|---|---|
| 8,812,482 B1* | 8/2014 | Kapoor | G06Q 30/01 379/114.14 |
| 9,129,238 B2 | 9/2015 | Chalana et al. | |
| 9,454,731 B1* | 9/2016 | Lee | G06N 3/08 |
| 2002/0143727 A1* | 10/2002 | Hu | G06F 19/321 |
| 2003/0069975 A1* | 4/2003 | Abjanic | H04L 63/0428 709/227 |
| 2006/0004844 A1* | 1/2006 | Rothschiller | G06F 17/2247 |
| 2014/0075242 A1 | 3/2014 | Dolinina et al. | |

(Continued)

OTHER PUBLICATIONS

Carson, et al.; "Collaboration in Regional Civilian and Military Transportation Planning"; GSC Associates Denver Co; 2007; 20 pages.

(Continued)

*Primary Examiner* — Scott T Baderman
*Assistant Examiner* — Hassan Mrabi
(74) *Attorney, Agent, or Firm* — Cantor Colburn LLP (57) ABSTRACT

Techniques are provided for performing automated operations to construct XML documents from source data based on user annotations of source data. A document received from a user includes source data and one or more annotations by the user regarding at least one subset of the source data. The received annotated document is parsed based on the user annotations. Parsing the received document includes generating data structures corresponding to the subsets of the source data based on the user annotations, and constructing a target XML document based on the generated data structures that includes information extracted from the annotated subsets of source data.

14 Claims, 5 Drawing Sheets

(56) References Cited

U.S. PATENT DOCUMENTS

2014/0379437 A1  12/2014 Singh
2015/0269221 A1* 9/2015 Raz .................. G06F 17/30646
                                                         707/706

OTHER PUBLICATIONS

Fletcher, Rebecca; "Facilitating Pharmacogenetic Association Studies Using an Extensible Genotype Information Management System"; Diss. Indiana University; May 2008; 58 pages.

Grebe, et al.; "Revitalizing Indigenous Languages"; Diss. Worcester Polytechnic Institute; (2013); 63 pages.

Ida, Masaaki; "Development of Web Service and Comparative Analysis of University Survey Data"; Soft Computing and Intelligent Systems (SCIS) and 13th International Symposium on Advanced Intelligent Systems (ISIS); Nov. 2012; 5 pages.

Kauhanen, Marty; "Examining Support of Narrative Scripting for Serious Games"; May 2009; Carleton University Ottawa; 167 pages.

* cited by examiner

METHOD AND SYSTEM TO CONVERT DOCUMENT SOURCE DATA TO XML VIA ANNOTATION

BACKGROUND

This disclosure relates to a method and a system to perform automated operations for constructing XML documents from source data based on user annotations.

It is often advantageous to retrieve and/or extract particular source data included in a spreadsheet or other document in an automated manner, and in particular to convert spreadsheet data into an XML document. Various approaches have been used to attempt such retrieval or extraction. Examples include manually defining a range of data of interest in a spreadsheet in converting that data into XML; such an approach is both error-prone and slow, especially if the data ranges defined in the spreadsheet change or are modified, and cannot typically handle parent/child relationships defined in the target XML schema. Other examples include saving a spreadsheet into XML directly; however, such approach results in cell-oriented XML files, and extra effort is needed to retrieve particular information of interest from any such XML files.

These and other existing approaches have typically involved operations performed on the entirety of the spreadsheet or other document, and therefore fail to extract particular information of interest, especially where such data includes multiple data tables having differentiated size and scope.

Accordingly, it is an object of the present invention to provide a method and system to construct XML documents from source data based on user annotations of documents containing that source data.

SUMMARY

According to at least one embodiment, a method implemented by one or more computing systems comprises receiving from a user a document that includes source data and one or more annotations by the user regarding at least one subset of the source data. The method further includes parsing the received annotated document based on the user annotations. Parsing the received document includes generating (based at least in part on the one or more annotations) one or more data structures corresponding to the subsets of the source data, and constructing (based at least in part on a mapping of the one or more data structures) a target XML document that includes information extracted from the one or more subsets of the source data.

According to another embodiment, a non-transitory computer-readable storage medium has stored contents that, when executed, configures a computing system to receive from a user a document that includes source data and one or more annotations by the user regarding at least one subset of the source data. The stored contents further configure the computing system to parse the received annotated document based on the user annotations. Parsing the received document includes generating (based at least in part on the one or more annotations) one or more data structures corresponding to the subsets of the source data, and constructing (based at least in part on a mapping of the one or more data structures) a target XML document that includes information extracted from the one or more subsets of the source data.

According to another embodiment, a computing system comprises one or more processors and at least one memory that includes instructions that, upon execution by a processor, cause the computing system to receive from a user a document that includes source data and one or more annotations by the user regarding at least one subset of the source data. The instructions further cause the computing system to parse the received annotated document based on the user annotations. Parsing the received document includes generating (based at least in part on the one or more annotations) one or more data structures corresponding to the subsets of the source data, and constructing (based at least in part on a mapping of the one or more data structures) a target XML document that includes information extracted from the one or more subsets of the source data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Embodiments disclosed herein enable automated operations to construct XML target documents from source data using annotations related to that source data.

In one embodiment, a set of XML tags is defined for users to annotate particular data subsets of interest in a spreadsheet. A spreadsheet document is received from a user by an annotation parsing module that searches the spreadsheet document for instances of the defined XML tags to identify particular subsets of source data delineated by the user.

The identified subsets of source data are used by a data structure generator communicatively coupled to the annotation parsing module to generate a list of entities, such as (as one non-limiting example) an entity that includes a table name, a row name, a column name, and a value. The generated data structure is then mapped into one or more target XML documents by an XML construction module communicatively coupled to the data structure generator.

Advantages of the exemplary approach described above are numerous. Such advantages include using human readable XML, annotation that can be added to an existing spreadsheet or other document without specialized software; and limiting the source data converted to the target XML documents to particular subsets of that source data explicitly indicated, rather than attempting to convert the entirety of a source document. Furthermore, once a spreadsheet is annotated, it can be used as a template for further modification, such that changes to the identified source data of interest remains easily parsed and converted without additional user annotation.

As used herein, the term "spreadsheet" refers to any document that includes source data subject to user annotation. In addition, as used herein the term "data structure" refers to any portion of data having a specialized format to suit a specific purpose.

Figure 1:
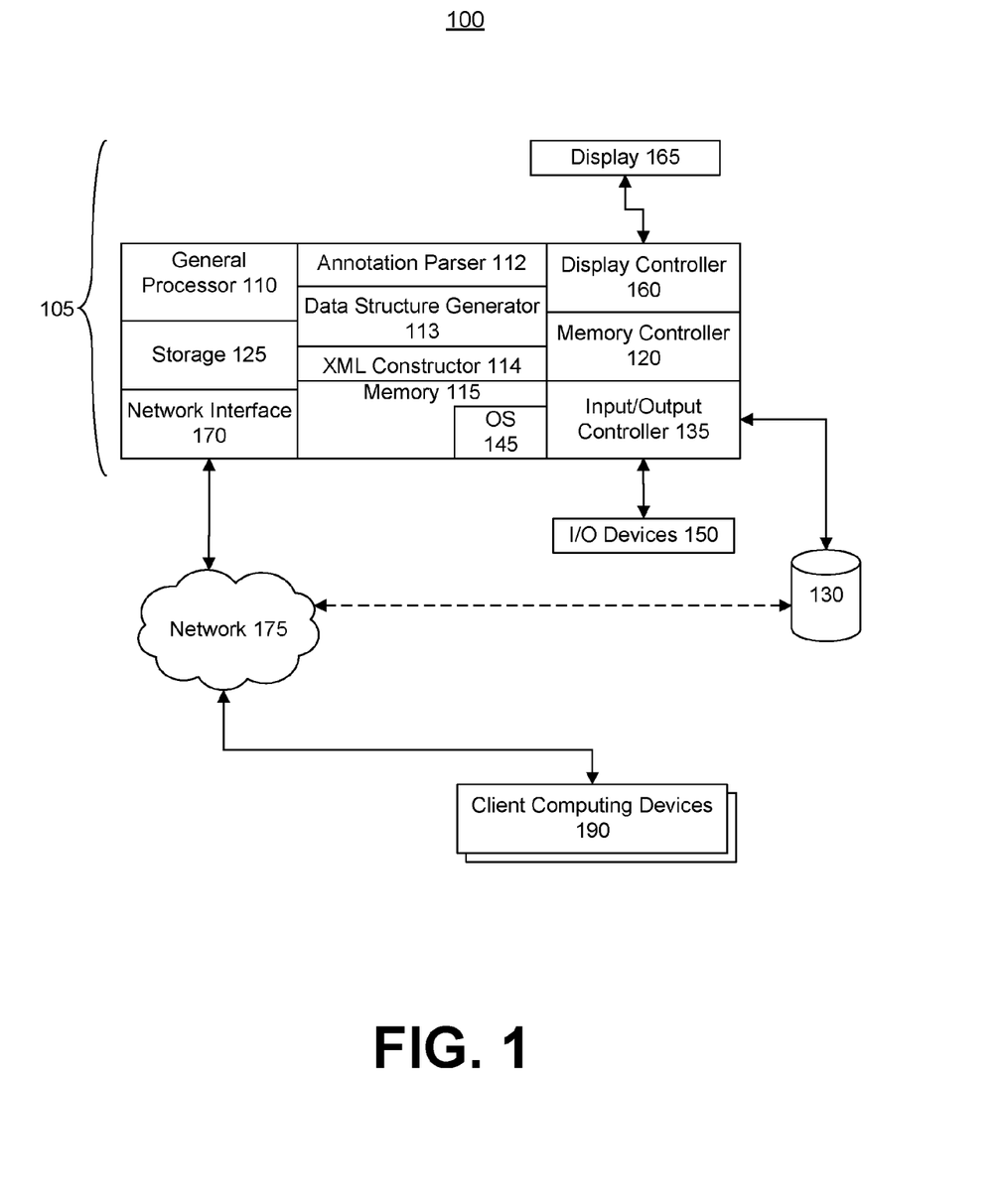
FIG. 1 depicts a block diagram of an exemplary network environment and computing system in accordance with an embodiment.

FIG. 1 illustrates a block diagram of a networked computing system 100 for use in practicing the teachings herein. The methods described herein can be performed or otherwise implemented via hardware, software (e.g., firmware), or combination thereof. In an exemplary embodiment, the methods described herein are implemented in hardware, and may be part of the microprocessor of a special or general-purpose digital computer, such as a personal computer, workstation, minicomputer, or mainframe computer. The computing system 100 therefore includes computer 105.

In the illustrated embodiment of FIG. 1, the computer 105 includes a general processor 110, an annotation parsing module 112, a data structure generator 113, an XML construction module 114, a memory 115 coupled to a memory controller 120, internal storage 125, and one or more input and/or output (I/O) devices 150 that are communicatively coupled to the computer 105 via a local input/output controller 135, which in the illustrated embodiment is further communicatively coupled to external storage 130. The input/output controller 135 may include one or more buses or other wired or wireless connections, as is known in the art. The input/output controller 135 may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components.

Also in the illustrated embodiment, the general processor 110 is a hardware device for executing hardware instructions or software, particularly that stored in memory 115. The general processor 110 can be any custom made or commercially available processor, a central processing unit (CPU), an auxiliary processor among several processors associated with the general-purpose computer 105, a semiconductor based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 1, the instructions in the memory 115 include a suitable operating system (OS) 145. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via input/output controller 135. In the depicted embodiment, the computing system 100 further includes a display controller 160 coupled to a display 165, and a network interface 170 communicatively coupled to a network 175. The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions.

Figure 5:
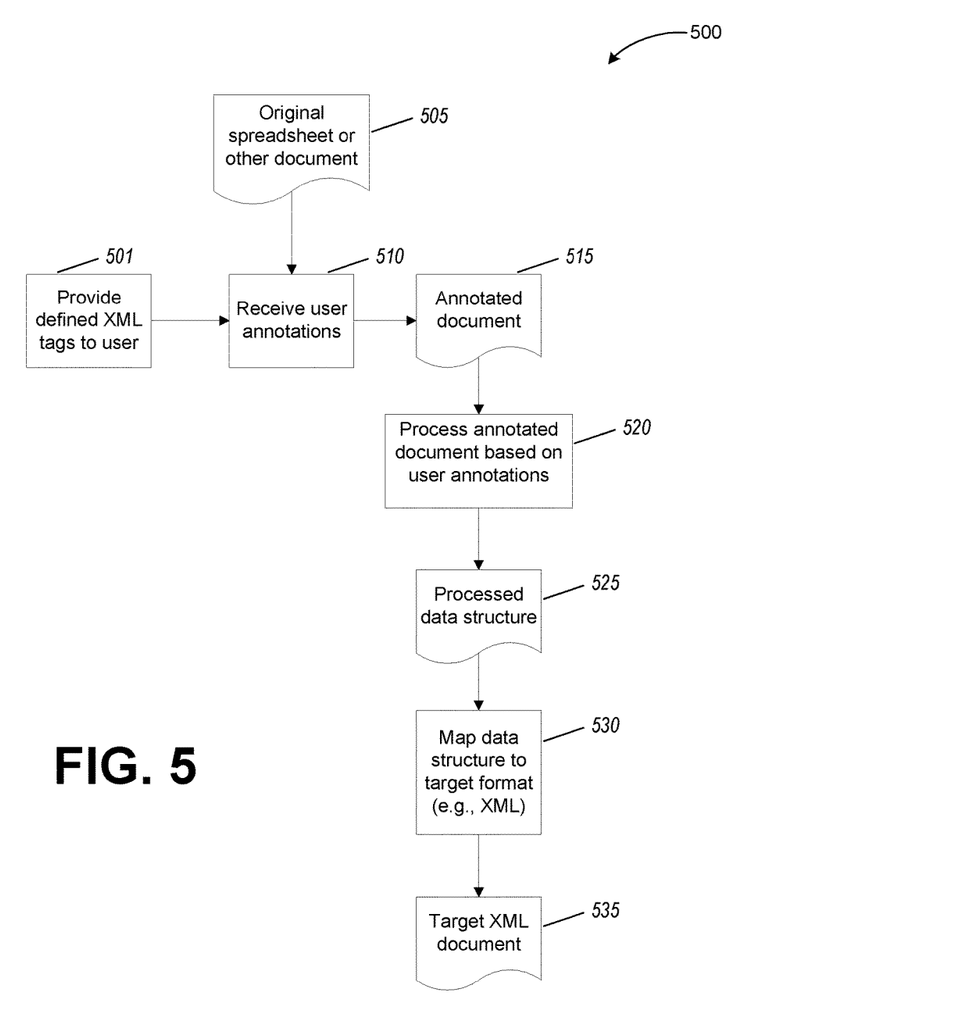
FIG. 5 depicts a process flow for automated data extraction and target XML document construction in accordance with an embodiment.

A process flow for automated data extraction and target XML document construction in accordance with an exemplary embodiment is depicted in FIG. 5. At block 501, a defined set of XML tags is provided to a user, who uses the defined set of tags to annotate a spreadsheet or other document 505. At block 510, the user annotations are received, resulting in an annotated document 515. At block 520, the annotated document 515 is processed by a processor-based device, such as by computer 105 via the annotation parser 112 and data structure generator 113 of FIG. 1.

The processing of the annotated document 515 results in a processed data structure 525. In certain embodiments, the processed data structure takes the form of a list of entities. For example, in at least one embodiment, a single such entity may include a table name (e.g., in string format); a row name (e.g., in string format); a column name (which may also be in string format); and a value (in string, integer, floating-point, or other appropriate format as needed). The data structure 525 is then mapped via block 530 into a target XML document 535, as described in greater detail elsewhere herein.

In this manner, the automated system generates a target XML document incorporating only those subsets of source data annotated by the user as being of interest, with the only user input required being simple user annotations based on a defined set of XML tags.

Figure 2:
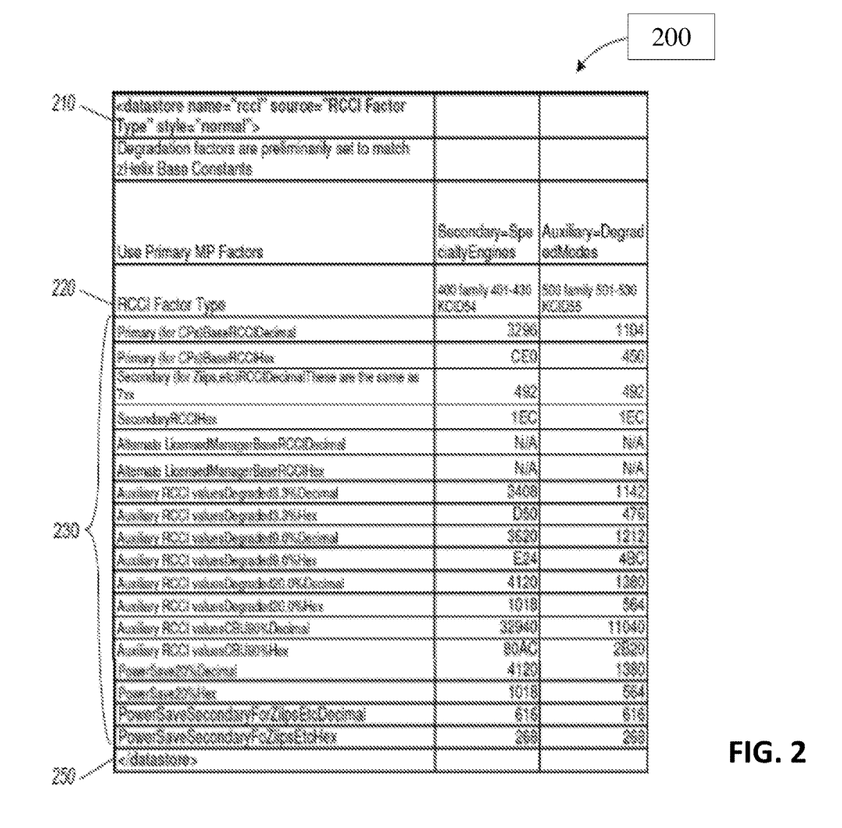
FIGS. 2-3 depict annotated subsets of one or more source documents in accordance with an embodiment.
Figure 3:
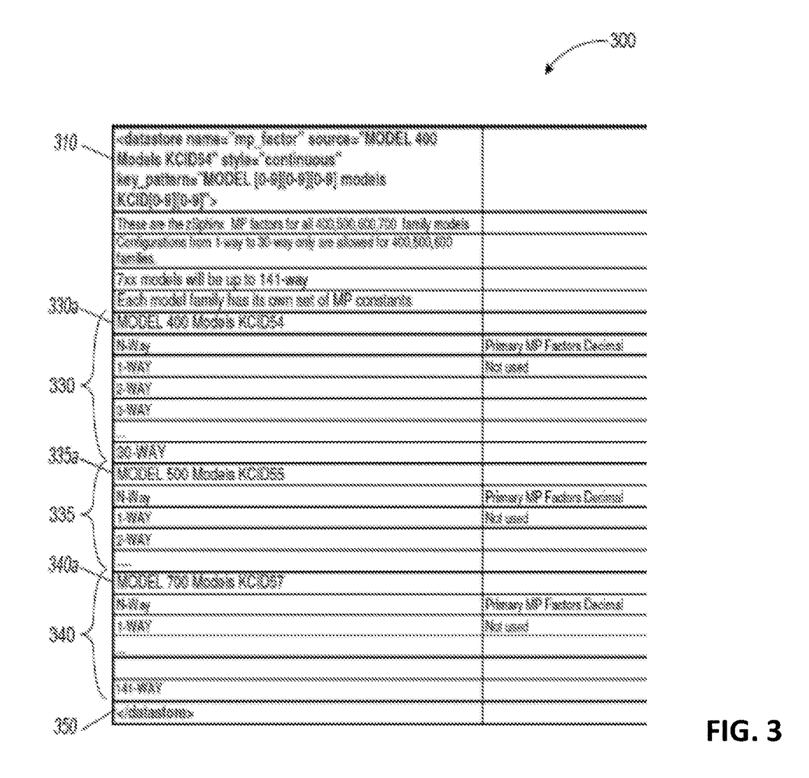

FIGS. 2 and 3 illustrate annotated subsets of a source document in accordance with one exemplary embodiment.

In particular, FIG. 2 partially depicts a data source table identified as being of interest in a spreadsheet 200 by XML annotations provided by a user in a manner similar to that described above with respect to annotated document 515 of FIG. 5. In the illustrated embodiment, a user has provided annotations 210 and 250 to both describe and delineate the boundaries of the data source table.

Annotation 210 comprises a "datastore" XML tag with parameters denoting a "name" for the datastore of "rcci", a "source" of "RCCI Factor Type" (indicating header text from the source table of interest), and a "style" parameter of "normal", indicating in the depicted embodiment that the source data table of FIG. 2 has a constant width (as measured by the number of columns in the table). In the source data table depicted, the table starts at "RCCI Factor Type" header 220, with the columns defined as "400 family 401-430 KCID54", "500 family 501-530 KCID55", etc. in the exemplary defined XML schema, the depicted source data table is understood to be identified by a header row, and therefore the data rows 230 begin from "Primary (for CPs) BaseRC-CIDecimal" to "PowerSaveSecondaryFoZiipsEtcHex". The "normal" constant-width data source table of FIG. 2 is in contrast, for example, to "continuous" tables having varied widths in columns, as discussed below with respect to FIG. 3.

Complementary user annotation 250 comprises a "/datastore" XML tag, denoting the end of the "rcci" datastore. In various embodiments, various XML tag schema may be defined and provided to the user for use in annotating data source tables.

Based on the user annotations 210 and 250, an annotation parser (such as annotation parser 112 of FIG. 1) can identify a particular data table of interest in the annotated spreadsheet 200 and in conjunction with a data structure generator (such as data structure generator 113 of FIG. 1) may generate a particular data structure incorporating the identified data table. For example, in certain embodiments the identified data source table may be converted into one or more Java objects.

FIG. 3 partially depicts a data source table in a spreadsheet 300, with the data source material again identified as being of interest via XML annotations provided by a user. In the illustrated embodiment, a user has provided annotations 310 and 352 both describe and delineate the boundaries of multiple data source tables.

Annotation 310 comprises another "datastore" XML tag. Included in the annotation are parameters indicating a "name" of "mp_factor", a "source" of "MODEL 400 Models KCID54"; and a "style" of "continuous", indicating in the exemplary embodiment that the data source includes multiple tables having varied widths (again, as measured by the respective number of columns in the multiple tables). Additionally, the annotation 310 includes a "key$_{13}$ pattern" parameter to identify a naming convention ("MODEL [0-9][0-9][0-9] models KCID[0-9][0-9]") associated with the multiple tables in the datastore. The provided naming convention may be used as a search pattern to identify individual tables within the specified datastore.

As with user annotation 250 of FIG. 2, complementary user annotation 350 comprises a "/datastore" XML tag, here denoting the end of the "mp factor" datastore.

Based on the user annotations 310 and 350, an annotation parser (such as annotation parser 112 of FIG. 1) can identify multiple data tables of interest in the annotated spreadsheet 300 by using the provided "key_pattern" parameter. In the depicted embodiment, the annotation parser identifies three respective header fields 330a, 335a, and 340a, respectively occurring at the beginning of separate source data tables 330, 335, and 340. In conjunction with a data structure generator (such as data structure generator 113 of FIG. 1) particular data structures (such as Java objects) may be generated that incorporate all of the identified data tables 330, 335, and 340. In addition, the identified data tables need not have (and the resulting generated data structures need not include) information corresponding to an identical quantity of columns and/or rows. For example, in the depicted spreadsheet 300, source data table 330 includes 32 rows ("30-way" in addition to the two header rows), whereas source data table 340 includes 143 distinct rows.

In at least one embodiment, a two-stage process may be used to convert the generated data structures, each comprising a list of entities, into a target XML document corresponding to the original data source tables of interest. As one example, in an embodiment JAXB ("Java Architecture for XML Binding") annotation is used to generate a target XML document after converting the data structures (e.g., Java objects) into JAXB annotated Java objects.

JAXB allows Java objects to be mapped to XML. There are multiple releases and implementations of JAXB, which is a part of the Java SE platform, one of the APIs in the Java EE platform, and part of the Java Web Services Development Pack ("JWSDP"). Main features of JAXB version 2 include an ability to unmarshal and marshal XML. To unmarshal XML is to convert XML Documents to Java objects that can be manipulated as such. To marshal XML is to convert Java objects to well-formed XML. The ability to manipulate Java objects and marshal them to XML provides a higher level of abstraction.

Particular JAXB annotations and code for the "rcci" and "mpFactors" objects appears below:

```
@XmlAccessorType(XmlAccessType.FIELD)
@XmlType(name = "", propOrder = {
  "mpFactors",
  "rcci"
})
@XmlRootElement(name = "rcciinfo")
public class Rcciinfo {
  @Override
    public String toString( ) {
      return "Rcciinfo [mpFactors=" + mpFactors + ", rcci=" + rcci +"]";
    }
    @XmlElement(name = "mp_factors", required = true)
  protected MpFactors mpFactors;
  @XmlElement(required = true)
  protected List<Rcci> rcci;
  /**
  * Gets the value of the mpFactors property .
  *
  * @return
  *     possible object is
  *     {@link MpFactors }
  *
  */
  public MpFactors getMpFactors( ) {
    return mpFactors;
  }
  /**
  * Sets the value of the mpFactors property .
  *
  * @param value
  *     allowed object is
  *     {@link MpFactors }
  *
  */
  public void setMpFactors(MpFactors value) {
    this.mpFactors = value;
  }
  /**
```

```
 * Gets the value of the rcci property.
 *
 * <p>
 * This accessor method returns a reference to the live list ,
 * not a snapshot. Therefore any modification you make to the
 * returned list will be present inside the JAXB object .
 * This is why there is not a <CODE>set</CODE> method for the rcci
property.
 *
 * <p>
 * For example, to add a new item, do as follows:
 * <pre>
 *     getRcci( ).add(newItem);
 * </pre>
 *
 *
 * <p>
 * Objects of the following type (s) are allowed in the list
 * {@link Rcci }
 *
 *
 */
public List<Rcci> getRcci( ) {
    if (rcci == null) {
       rcci = new ArrayList<Rcci>( );
    }
    return this.rcci;
  }
}
```

Figure 4:
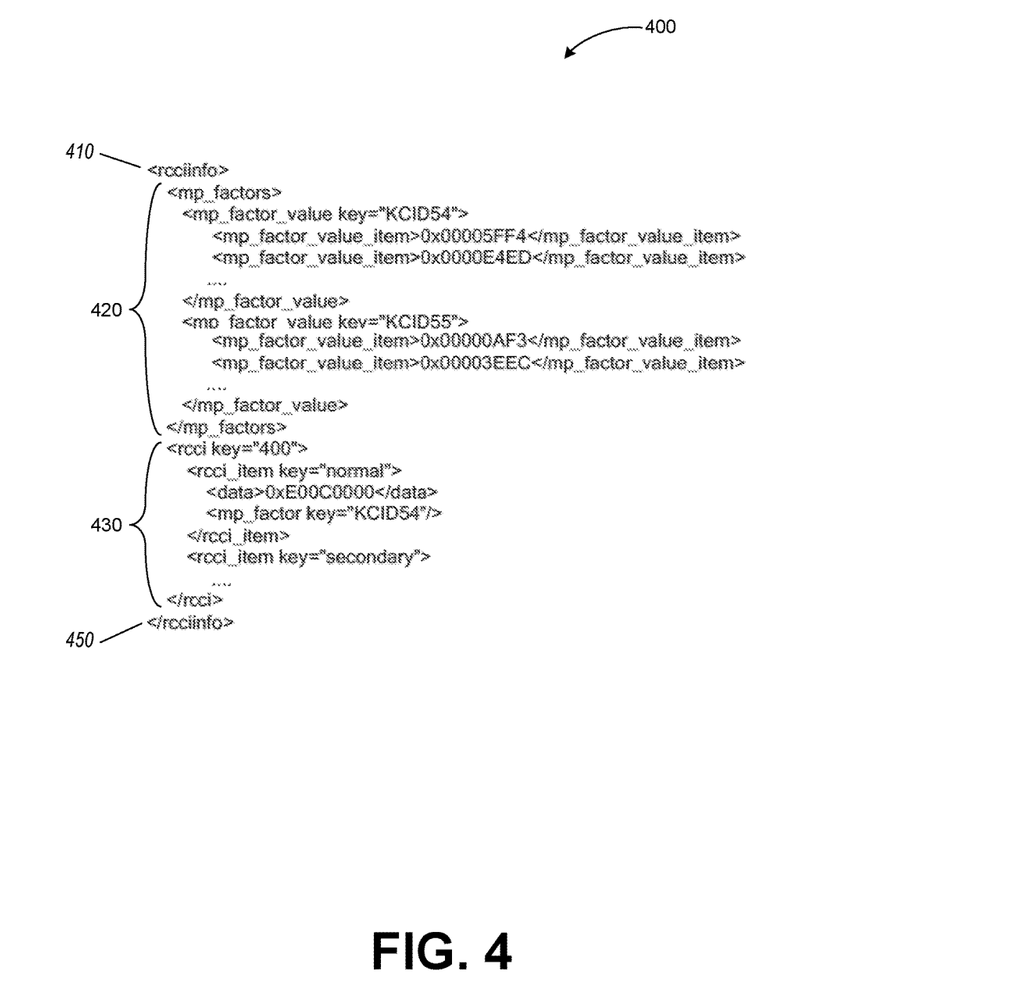
FIG. 4 depicts a portion of an exemplary target XML document constructed in accordance with an embodiment.

In at least some embodiments, the data structures generated based on identified source data tables may be aggregated as the basis for creating a target XML document. FIG. 4 partially depicts an exemplary target XML document constructed in accordance with such an embodiment. Here, XML section "rcciinfo" is delineated with the generated tags 410 ("<rcciinfo>") and 450 ("</rcciinfo>"). It includes both portion 420 corresponding to the "mp_factors" datastore of FIG. 3, as well as portion 430 corresponding to the "rcci" datastore of FIG. 2. It will be appreciated that in various embodiments, various approaches in accordance with the techniques disclosed herein may be used to determine whether to incorporate multiple data source tables into a single target XML document. For example, in certain embodiments a user may specify (such as via additional parameters associated with a defined XML tag schema) whether such aggregation is to be performed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    providing a defined set of XML tags to a user for annotating a document;
    receiving, by one or more computing systems and from the user, the document that includes source data and one or more annotations by the user regarding a subset of the source data, wherein the one or more annotations are selected from the defined set of XML tags and wherein each of the one or more annotations describe and delineate boundaries of the subset of the source data;
    parsing, by the one or more computing systems, the document based on the one or more annotations, wherein parsing the document includes:
        generating, based at least in part on the one or more annotations, one or more data structures corresponding to the subset of the source data; and
        constructing, based at least in part on mapping of the one or more data structures, a target XML document that consists of information extracted from the subset of the source data, wherein the subset includes multiple distinct subsets of the source data, and wherein at least one of the distinct subsets includes a data table having a first number of columns that is distinct from a second number of columns included in a data table associated with at least one other of the distinct subsets.

2. The computer-implemented method of claim 1, wherein the one or more annotations include one or more XML annotations.

3. The computer-implemented method of claim 1, wherein generating the one or more data structures includes generating one or more Java objects.

4. The computer-implemented method of claim 1, wherein at least one of the one or more data structures is defined as a list of entities such that each entity includes a table name, a row name, a column name, and one or more values.

5. The computer-implemented method of claim 1, wherein the document comprises an annotated spreadsheet.

6. A non-transitory computer-readable medium having stored contents that, when executed, configure a computing system to:
    provide a defined set of XML tags to a user for annotating a document;
    receive, by the computing system and from the user, the document that includes source data and one or more annotations by the user regarding subset of the source data, wherein the one or more annotations are selected from the defined set of XML tags and wherein each of the one or more annotations describe and delineate boundaries of the subset of the source data;
    parse, by the computing system, the document based on the one or more annotations, wherein parsing the document includes:
        generating, based at least in part on the one or more annotations, one or more data structures corresponding to the subset of the source data; and
        constructing, based at least in part on mapping of the one or more data structures, a target XML document that consists of information extracted from the subset of the source data, wherein the subset includes multiple distinct subsets of the source data, and wherein at least one of the distinct subsets includes a data table having a first number of columns that is distinct from a second number of columns included in a data table associated with at least one other of the distinct subsets.

7. The non-transitory computer-readable medium of claim 6, wherein the one or more annotations include one or more XML annotations.

8. The non-transitory computer-readable medium of claim 6, wherein generating the one or more data structures includes generating one or more Java objects.

9. The non-transitory computer-readable medium of claim 6, wherein at least one of the one or more data structures is defined as a list of entities such that each entity includes a table name, a row name, a column name, and one or more values.

10. The non-transitory computer-readable medium of claim 6, wherein the document comprises an annotated spreadsheet.

11. A computing system, comprising:
one or more processors; and
at least one memory, the memory including instructions that, upon execution by at least one of the one or more processors, cause the computing system to:
provide a defined set of XML tags to a user for annotating a document;
receive the document that includes source data and one or more annotations by the user regarding subset of the source data, wherein the one or more annotations are selected from the defined set of XML tags and wherein each of the one or more annotations describe and delineate boundaries of the subset of the source data;
parse the received annotated document based on the one or more annotations, wherein parsing the received document includes:
generating, based at least in part on the one or more annotations, one or more data structures corresponding to the subset of the source data; and
constructing, based at least in part on mapping of the one or more data structures, a target XML document that consists of information extracted from the subset of the source data, wherein the subset includes multiple distinct subsets of the source data, and wherein at least one of the distinct subsets includes a data table having a first number of columns that is distinct from a second number of columns included in a data table associated with at least one other of the distinct subsets.

12. The computing system of claim 11, wherein the one or more annotations include one or more XML annotations.

13. The computing system of claim 11, wherein generating the one or more data structures includes generating one or more Java objects.

14. The computing system of claim 11, wherein at least one of the one or more data structures is defined as a list of entities such that each entity includes a table name, a row name, a column name, and one or more values.

* * * * *